March 6, 1956  A. M. BRENNEKE  2,737,429
PISTON RING ASSEMBLY
Filed June 5, 1953
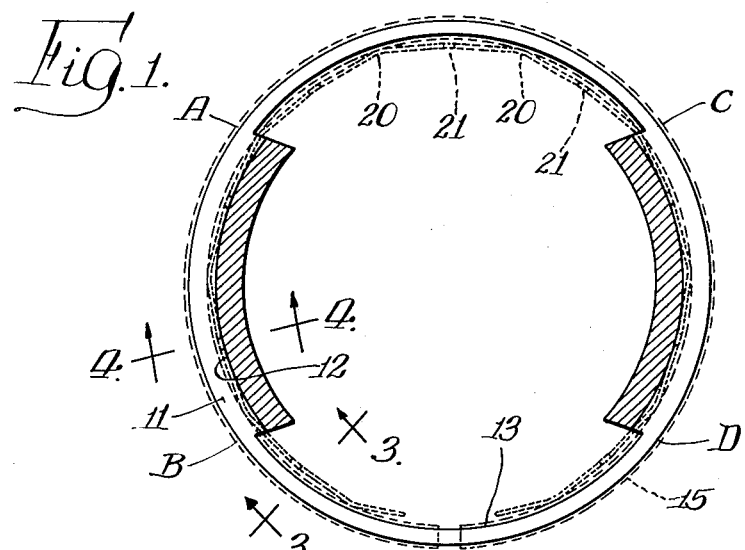
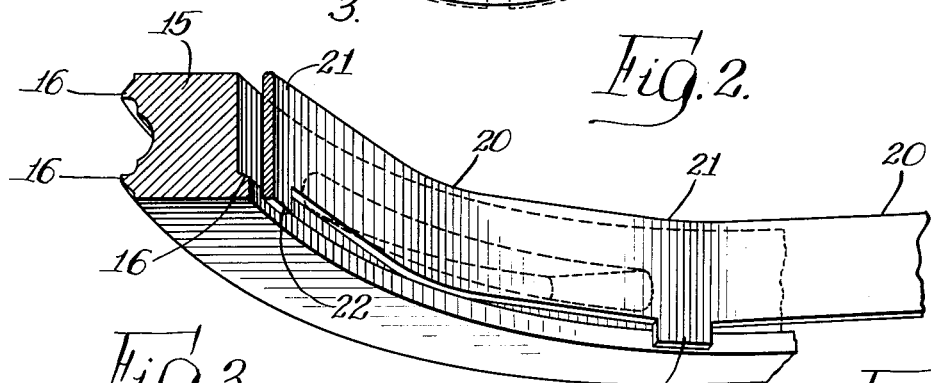
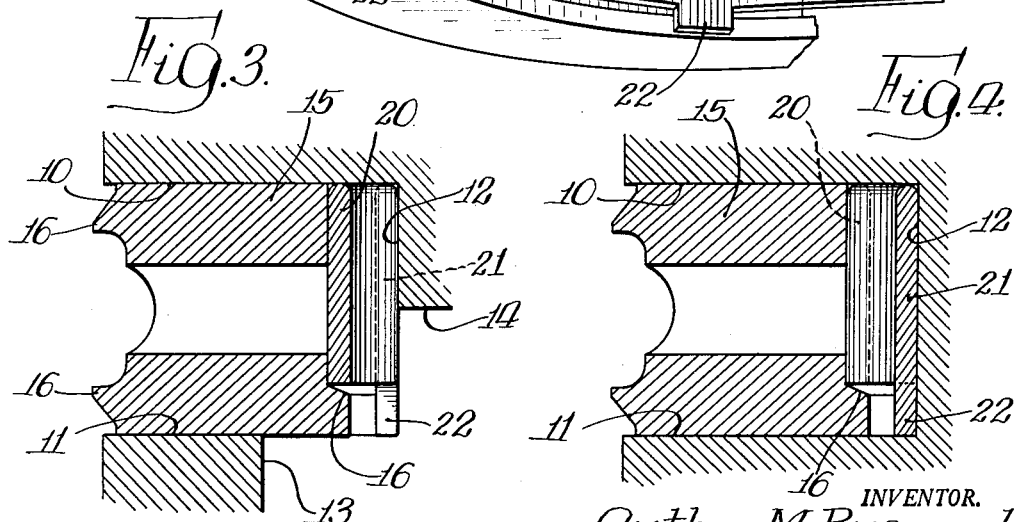
INVENTOR.
Arthur M. Brenneke,
BY
Davis, Lindsey, Hibben & Noyes
Attys.

United States Patent Office 2,737,429
Patented Mar. 6, 1956

2,737,429

PISTON RING ASSEMBLY

Arthur M. Brenneke, Hagerstown, Ind., assignor to Perfect Circle Corporation, Hagerstown, Ind., a corporation of Indiana Application June 5, 1953, Serial No. 359,705

2 Claims. (Cl. 309—29)

The invention relates generally to piston rings and more particularly to piston ring assemblies for internal combustion engines.

A piston ring assembly comprising a ring member and an expander spring has frequently been used as an oil ring in a piston for an internal combustion engine. The form of expander spring most commonly used for such an assembly is the ordinary hump spring comprising a strip of flat spring steel bent into a generally polygonal shape to provide circumferentially spaced portions adapted to bear against the inner surface of the ring member and intervening portions adapted to bear against the bottom of the groove to exert an outward pressure on the ring member. With the usual form of piston, the sides of the groove hold the hump spring in proper position to exert such outward pressure and there is no way in which the spring can become misplaced, once it has been properly installed.

In some forms of pistons which are being used at present, the inner portion of the lower side of the groove as well as the lower portion of the bottom of the groove are cut away for parts of the circumference of the piston to open the groove freely to the interior of the piston. With such a piston construction, the ordinary hump spring is not satisfactory since at such cut away portions, the spring can slip downwardly into the opening where the bottom side of the groove is cut away, and thus will not cooperate with the ring member properly to exert outward pressure thereon.

The general object of the invention is therefore to provide a novel piston ring assembly comprising a ring member and an expander spring which are held in proper relation to each other by their construction and thus are usable in pistons of the above-described type with assurance that the spring will not drop into the cut-away portions of the piston.

Another object is to provide a novel piston ring assembly comprising a ring member and an expander spring so constructed that, when used with a piston of the above-described type, the spring may be first placed in the groove and thereafter the ring member, with assurance that the ring member and spring will be properly positioned relative to each other.

Other objects and advantages will become apparent from the following description taken in connection with the accompanying drawing, in which:

Fig. 1 is a transverse sectional view of a piston of the type for which the present ring assembly is particularly adapted and showing in dotted lines a ring assembly embodying the features of the invention;

Fig. 2 is a fragmentary perspective view of the piston ring assembly shown in dotted lines in Fig. 1;

Fig. 3 is an enlarged fragmentary sectional view taken on the line 3—3 of Fig. 1; and Fig. 4 is an enlarged fragmentary sectional view taken on the line 4—4 of Fig. 1.

In the ordinary type of piston heretofore employed in internal combustion engines, the surfaces forming the groove for the oil ring are continuous throughout the circumference of the piston, except in certain instances for a few drain holes extending from the inner part of the groove to the interior of the piston to carry oil scraped from the wall of the cylinder by the ring to the crank case of the engine. When a piston ring assembly of the type comprising a ring member and a hump spring is used in a groove of this character, the sides of the groove hold the hump spring in alignment with the ring member so that it bears outwardly against the ring member to perform its intended function.

Some pistons made today are provided with much greater openings at the inner part of the oil ring groove, and these openings extend for substantial portions of the circumference of the piston. In fact, they are so large that an ordinary hump spring may drop down into such openings and be prevented from bearing outwardly against the ring member in the desired manner. One example of such a piston is that which is used in present models of Buick automobiles, where the inner portion of the lower side of the groove and the lower portion of the bottom of the groove are completely cut away and open into the interior of the piston at diametrically opposite areas each constituting more than one-quarter of the total circumference of the piston. The portions of an ordinary hump spring overlying such open areas can become cocked by partially dropping into the cut-away portion, so that the spring does not exert a proper outward pressure on the ring member. There is no tendency, of course, for the ring member to drop into the cut-away portions because the ring member has sufficient radial width to rest firmly on the outer solid portion of the lower side of the groove.

The present invention provides a ring assembly of this general type but with the ring member constructed to hold the hump spring in proper relation to the inner periphery of the ring member. The hump spring may be also provided with means for positioning it within the groove of the piston during installation so that the hump spring and ring member will enter into the proper cooperative relation with each other when the two are installed. These features are accomplished by providing a ledge on the ring member, supporting the spring so that it cannot drop down into the cut-away opening in the piston, and the ring member is provided with legs or projections engaging those portions of the circumference of the lower side of the groove that are not cut away so as to hold the spring in proper position to permit it to rest on the ledge when the ring member is installed after installation of the spring.

A piston of the type hereinbefore referred to is shown in transverse section in Fig. 1 and in vertical section in Figs. 3 and 4. Such a piston is provided with an oil ring groove having an upper side 10, a lower side 11 and a bottom 12. As stated above, the groove has complete sides and bottom for portions of its circumferential length, and in other portions, parts of the lower side of the groove and the bottom are cut away. Thus, those portions of the groove which are above the piston pin bosses, such as the portion between the points A and B in Figure 1 of the drawing and the portion between the points C and D, are solid so that the sides and bottom are complete. One of these portions of the groove is shown in radial cross section in Fig. 4 of the drawings. However, the areas of the groove between the above-mentioned portions and adjacent the thrust faces of the piston, such as the area between the points A and C and the area between the points B and D, are cut away as above-described. Thus, the inner portion of the lower side of the groove is cut away from a line 13 inwardly (as shown in Fig. 3), and the bottom 12 of the groove is cut away from a line 14 downwardly to provide a wide opening communicating with the interior of the piston. It will be noted from Fig.

1 that each such cut-away portion extends for more than a quarter of the circumference of the piston so that very little support is provided for a hump spring in an upwardly direction, the only support by the piston being provided in those portions where the side and bottom of the groove are complete, as illustrated in Fig. 4. Consequently an ordinary hump spring could readily become cocked by dropping into the openings between the lines 13 and 14.

A ring assembly comprising a ring member and an expander spring but embodying the features of the invention avoids this difficulty. To this end, the ring member, indicated at 15, is provided with a ledge 16 at its lower side. The ring member 15 may be of any desired form and in the drawing is shown as a cast iron ring member provided with a pair of cylinder-engaging flanges 16 on its outer periphery. The ring member of course is properly dimensioned to fit within the groove between the sides 10 and 11.

The hump spring in this case is adapted to be supported by the ledge 16 on the ring member 15. The hump spring comprises a strip of metal bent into a generally polygonal form to provide ring-engaging portions 20 and connecting portions 21 adapted to engage the bottom 12 of the groove. The ring-engaging portions 20 are of such width that they may be interposed between the ledge 16 on the ring member 15 and the upper side of the groove. Preferably the portions 20 are of a width substantially equal to the axial height of the ring member above the ledge 16, as illustrated in Fig. 3. In order to cause the ring-engaging portions 20 to properly engage the inner periphery of the ring member, the upper surface of the ledge 16 is slanted upwardly and outwardly from its inner periphery, as is clearly shown in Fig. 3, so that the slanting surface provides a camming action tending to shift the spring upwardly under the outward pressure thereof. Thus, the portions 20 will be held in outward bearing engagement with the inner periphery of the ring above the ledge and the lower edge of the portions 20 will rest on the ledge. In this manner, after the ring and spring are properly installed in the groove, the spring will be prevented from slipping downwardly into the opening at the lower side of the groove and thus will be maintained in proper outward bearing relation with the ring member.

In order to insure proper installation of the ring member and spring, the ring member is provided with means to hold it spaced above the bottom of the groove so that the ring-engaging portions 20 can seat on the ledge 16. To this end, the portions 21 adapted to engage the bottom of the groove are provided with legs 22 adapted to rest on the lower side of the groove at those portions where it has not been cut away, such as the portions between the points A and B and between the points C and D. Thus, the legs 22 have a height substantially equal to the axial height of the ledge 16. A spring with legs of this character may be easily formed from a strip of metal having a width substantially equal to the axial height of the groove and then cut away or notched on its lower side to provide the legs 22 and to provide an axial width for the portions between the legs substantially equal to the height of the ring member above the ledge.

When the spring is installed in the groove, the legs 22 rest against the solid portions of the bottom 11 of the groove and thus hold the ring-engaging portions 20 of the spring spaced above the bottom of the groove. When the ring member is thereafter installed, the ledge 16 will enter under the portions 20 of the spring so that the portions 20 will engage the inner periphery of the ring above the ledge. If the spring has dropped a slight amount, the slanting surface on the ledge 16 will cam the spring upwardly into the proper position.

With this construction of the piston ring assembly, the spring when used with the type of piston herein disclosed, is prevented from dropping into the open portions at the lower side of the groove. Thus proper cooperation between the spring and the ring member is assured.

I claim:

1. A piston ring assembly comprising a ring member having an inwardly projecting ledge at its lower side, and a hump spring comprising circumferentially spaced ring engaging portions bearing against the inner surface of the ring member above said ledge, and piston engaging portions connecting the ring engaging portions and adapted to seat against the bottom of the groove, each of said piston engaging portions having a downwardly extending leg substantially equal in height to the axial thickness of the ledge, said legs being adapted to engage the lower side of the groove in the piston where said lower side is solid, to hold the spring above said ledge.

2. A piston ring assembly comprising a ring member having an inwardly projecting ledge at its lower side, and a hump spring comprising circumferentially spaced ring engaging portions bearing against the inner surface of the ring member above said ledge, and piston engaging portions connecting the ring engaging portions and adapted to seat against the bottom of the groove, each of said piston engaging portions having an axial width for at least a portion of its length substantially equal to the axial width of the groove, and each of said ring engaging portions being cut away on its lower side to an axial width substantially equal to the height of the ring member above said ledge.

References Cited in the file of this patent

UNITED STATES PATENTS

| | | |
|---|---|---|
| 1,734,055 | Solenberger | Nov. 5, 1929 |
| 1,802,573 | Ramsey | Apr. 28, 1931 |
| 1,868,744 | Grant | July 26, 1932 |